United States Patent [19]

Ban

[11] Patent Number: 4,644,679
[45] Date of Patent: Feb. 24, 1987

[54] METHOD OF CONNECTING A FISHING NET
[75] Inventor: Tatsuzo Ban, Aichi, Japan
[73] Assignee: Toyohashi Braided Rope Industrial Co., Ltd., Japan
[21] Appl. No.: 859,004
[22] Filed: May 2, 1986
[51] Int. Cl.$^4$ ............... A01K 71/100; A01K 73/112
[52] U.S. Cl. .......................................... 43/7; 43/14; 87/13
[58] Field of Search .................. 43/7, 10, 14; 87/13
[56] References Cited

U.S. PATENT DOCUMENTS

| | | | |
|---|---|---|---|
| 311,377 | 1/1885 | Sabens | 43/14 |
| 379,751 | 3/1880 | Winsor | 43/14 |
| 919,108 | 4/1909 | Yancey | 43/14 |
| 3,165,853 | 1/1965 | Ansell | 43/7 |
| 4,065,835 | 1/1978 | Yoneya | 43/7 |

Primary Examiner—Nicholas P. Godici
Assistant Examiner—Christopher L. McKee
Attorney, Agent, or Firm—Wigman & Cohen

[57] ABSTRACT

A method of effectively connecting a fishing net without the necessity for tying each net mesh to the support rope prevents a tearing-off of the fishing net with consequent loss of the net. During the connecting operation, a number of pairs of depending ear portions are formed along the support rope, one after another, by inserting a first depending ear portion into the support rope to form a second ear portion. The net is hung from the depending ear portions. Each pair of depending ear portions are successively connected to one another, without tying the two together at any position on the support rope.

4 Claims, 9 Drawing Figures

4,644,679

METHOD OF CONNECTING A FISHING NET

BACKGROUND OF THE INVENTION

The present invention relates to a method of connecting a support rope and net meshes of a drift gill net and a fixed net for fishing. By a drift gill net is meant the type of gill net which captures fish by taking advantage of driftage.

As is well known, a fishing net, for instance, a fixed net as shown in FIG. 10, depends from the sea surface until it is expanded in the sea as required. When counter boring moment, which is a kind of pressure generated by waves on the surface of the sea, or other forces are intensively exerted on the fishing net, there is a possibility that the cords constituting the support rope will be torn off and thereby the whole fishing net will fall to the bottom of the sea. Furthermore, there is a necessity for making the connection of the fishing net to the support rope having a large diameter at certain predetermined intervals as seen in the longitudinal direction of the support rope, when the fishing net expansion operation is performed.

With the foregoing background in mind the following requirements have been specified by many fishing net users in many countries over the world:

1. There is a need for improvement relative to the assembly and disassembly operations of a fishing net,
2. There is a need for a connection between the support rope and the fishing net without tying the two together and at the same time avoiding a tearing off of the fishing net from the support rope,
3. There is a need for minimizing the area where the net expansion operation is performed and of the time required for carrying out the expansion of the net.

To facilitate understanding of the other disadvantageous feature of the conventional net expansion method, FIG. 10 illustrates a typical conventional method where an intermediate rope R' is connected to a main rope R, provided with floats in the spaced relation, with the use of connecting ropes interposed therebetween. A fishing net is then connected to the intermediate rope R' by means of another connecting rope R" having an elliptical or half-elliptical shape as seen from the side, with a number of binding knots formed along the upper edge of the fishing net. The above-noted connecting ropes R" are called zig-zag ropes.

However, the above-described structure of the conventional fishing net using so-called zig-zag ropes leads to a result that it cannot be manufactured in an inexpensive cost. This is also true in the case of a drift gill net (not shown) which does not require a main rope R. Thus, the conventional drift gill net also cannot be manufactured inexpensively.

Accordingly, it is an object of the present invention to provide an improved method of connecting a fishing net which is entirely free from the drawbacks inherent to the conventional methods as mentioned above.

SUMMARY OF THE INVENTION

The present invention relates to the method of connecting a fishing net by successively connecting each net mesh to the support rope and disassembling the thus expanded fishing net and consists in that a number of loop-shaped ear portions are formed with the use of a single cord which is integrally stranded together with the support rope, a smaller ear portion is projected from the lower surface of the support rope after the ear portion is penetrated through the support rope and successive connection is carried out by inserting the ear portion through the circular hollow space of the smaller ear portion while each net mesh is hung on the stretched ear portion whereby fishing net expanding is achieved without tying at any position along the support rope. The thus expanded fishing net can satisfactorily stand against counter boring moment which is generated by roaring waves on the sea.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF A PREFERRED EMBODIMENT

Figure 1:
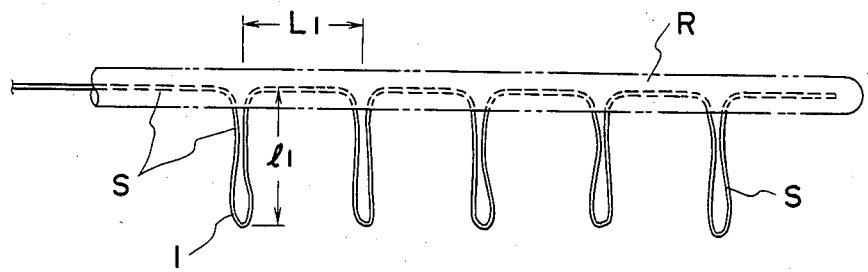
FIGS. 1 and 2 are front elevations of a fishing net made in accordance with the invention, illustrating how a smaller cord S having a circular cross-sectional configuration is stranded with the support rope in the flexibily stranded state and a number of ear portions having the same length depend from the support rope in an equally spaced relation.
Figure 2:
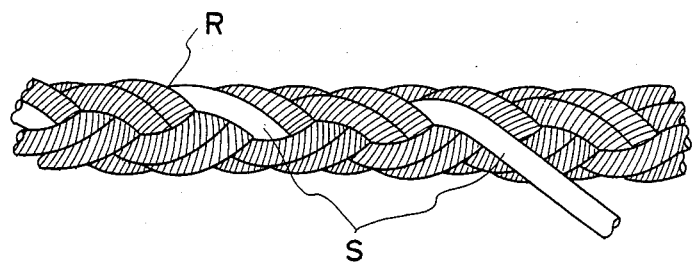
Figure 3:
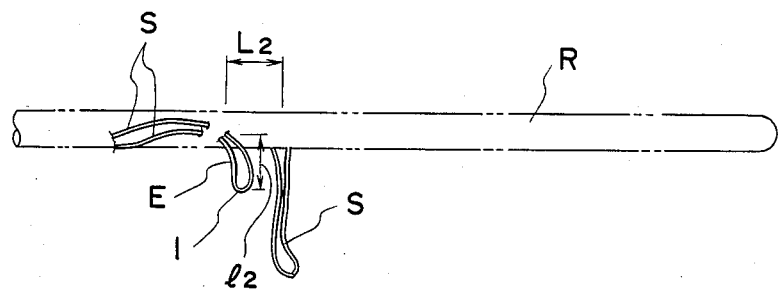
FIG. 3 is a fragmental view of the support rope made in accordance with the invention, particularly illustrating how a smaller ear portion E is formed during net connecting operation.

Referring now in detail in the drawings wherein like parts are designated by like reference numerals and letters throughout, there is illustrated in FIGS. 1 to 3 a support rope R which is constituted by the combination of a plurality of unit cords (strands) and a stranding cord S having the circular cross-sectional shape (stranded cord having a high tensile strength) both of which are stranded together in the illustrated manner, wherein a number of ear portions S,S,S . . . (which will be described in more detail later) depend from the support rope R.

When the support rope R specially designed for practicing the present invention is manufactured automatically, each of the ear portion S,S,S . . . is uniformly drawn downwardly from the rope in such a manner that depending length $l_1$ of the one ear S is determined a little longer or substantially the same dimension as span $L_1$ of said ear S as measured between the adjacent ear portion S.

In practical fishing operations using the drift gill net, a number of support ropes R having various diameters (in the range of 3 to 50 mm) were employed. However, for the purpose of simplification, the description will be made below only to the case where the support rope R has a diameter of 7 mm. In this case, the support rope R is constituted by the combination of eight (8) unit cords stranded flexibly together with a support cord (designated "S" in the Figures of the drawings) out of said eight (8) cords, having a diameter of 3 mm (FIG. 2). Additionally depending length $l_1$ of the ear portion S and span $L_1$ between the adjacent ear portion S are determined substantially the same and have a length in the range of 25 to 30 cm.

Figure 4:
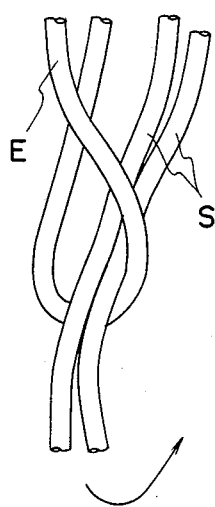
FIGS. 4 and 5 are further fragmental views of a fishing net made in accordance with the invention illustrating how a main ear portion S is inserted through the circular hollow space of the smaller ear portion E without any formation of binding knot while net meshes are hung thereon one by one.

To assure that functions to be described later are realized the foremost end 1 of the ear portion S is inserted in the direction of expansion through the structure of the support rope R and is then drawn downwardly therefrom until a smaller hollow ear portion E is formed (FIG. 3). The smaller ear portion E has a depending length $l_2$ as measured from the position where the ear portion S comes out of the support rope R. Then, the next longer ear portion S is extended through the smaller ear portion E in such a manner as shown in FIG. 4 whereby advantageous features (which will be described later) are obtainable. To assure that the disassembling operation is easily performed without interruption, the smaller ear portion E is formed in such a manner that length $l_2$ is approximately equal to length $L_2$ and as previously indicated, length $l_1$ approximately equals span $L_1$.

Since the support rope R specially designed for the invention provides merely a number of depending ear portions S,S,S . . . which have the same length $l_1$ as described above, support rope R can be manufactured on the basis of mass production at substantially the same cost as the conventional one despite the kind of material used.

Next, the description will be made below as to the step of connecting prior to net expansion operation with reference to FIG. 5. The foremost end 1 of the first ear portion S (not shown) is penetrated through the support rope R with the aid of a suitable insert sleeve (not shown) while it is held by operator's hand. Thereafter, said end 1 extends in the direction of net expansion until it projects from the support rope S (on the lower surface of the support rope) at the position located in the proximity of the starting point 2' of span $L_2$.

Figure 5:
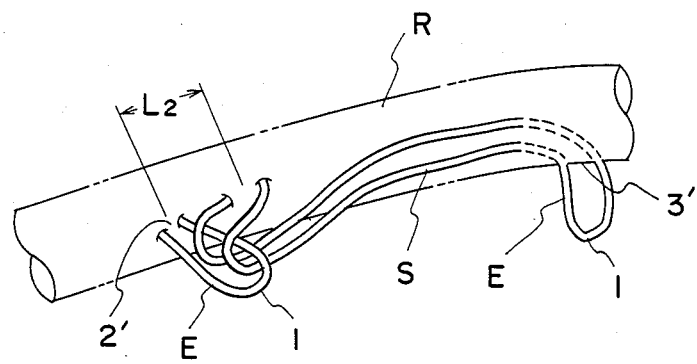

As will be apparent from the drawing, the projected part of the ear portion S can be easily deformed to a smaller ear portion E (FIG. 5). At this moment it is confirmed by operator's visual inspection or measuring operation whether the dimensional relation $l_2 = L_2$ is substantially established or not.

Figure 6:
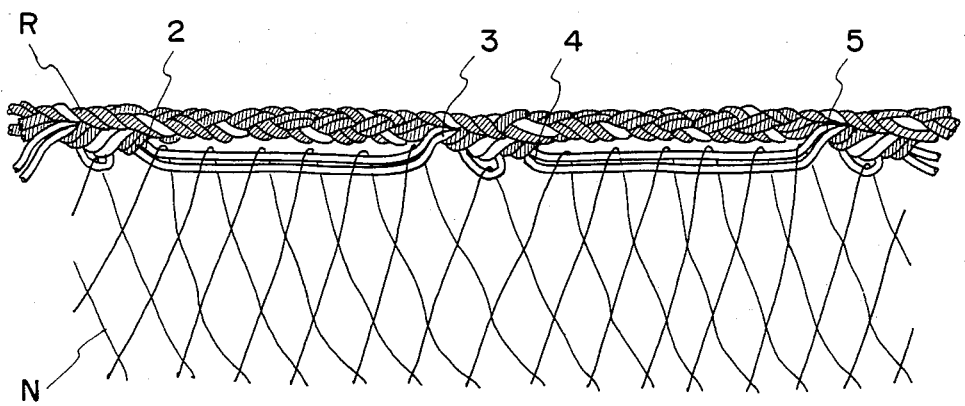
FIG. 6 illustrates how the main ear portion S is stretched in the transverse direction as seen from the side one after another while net expansion operation is performed.

Then, the next ear portion S is extended through the circular hollow space of the smaller ear portion E by its full length (FIG. 4). Thereafter, the connecting end part of each of net meshes N is hung on the ear portion S one after another before the latter is stretched in the transverse direction by a pulling operation (FIG. 6).

When the connecting operation is completed by a distance of about 25 cm ($L_1$) equal to one stretched section, the next smaller ear portion E (as identified by point 3') is formed in the same manner as mentioned above (FIG. 5). On completion of forming of the smaller ear portion E in that way, the following ear portion S is extended through said portion E and this operation is repeated successively.

According to the method of connecting the fishing net pertaining to the present invention, it results that the variable depending points 2', 3' . . . of the smaller ear portions E,E,E . . . (FIG. 5) are located in the vicinity of the fixed depending points 1,2,3,4,5 . . . of the loop-shaped main ear portions S,S,S . . . (FIG. 6) and both the smaller ear portion E and the ear portion S are overlapped one above another when the latter is stretched is the transverse direction whereby net expansive force and durability of the support rope R are improved multiplicatively.

As a result of a number of fishing operations using drift gill net of which support rope had a diameter of 7 mm and which was not loaded with weights in the sea it was estimated that each of the support ropes (constituted by eight (8) stranded unit cords made of polypropylene) for drift gill net had rope strength as well as expansive force of 1,240 kg, when it was assumed that the drift gill net was immersed at the average depth of 10 m in the sea, its width in the expanded state amounted to 50 m and its total weight as measured in the sea was 11.3 kg (it should be noted that measurements were carried out in accordance with relevant Japanese Industrial Standard measuring methods).

Figure 7:
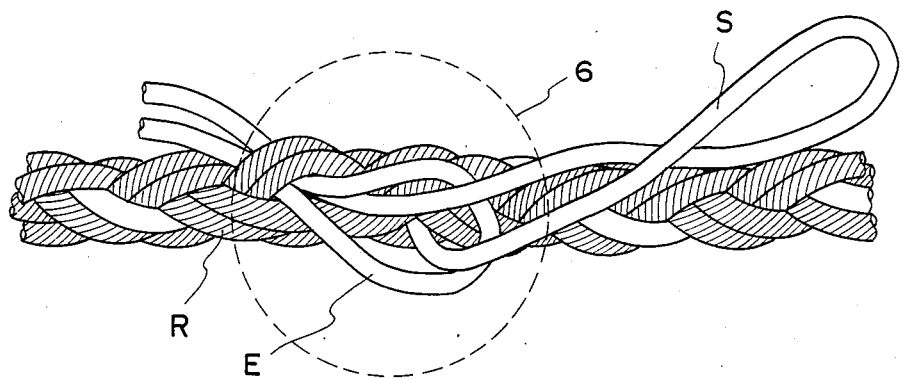
FIG. 7 is a fragmental enlarged view of the support rope made in accordance with the invention, particularly showing one of a number of projected parts which are formed in the spaced relation on the lower surface of the support rope without any formation of binding knot.

According to the method of the present invention, a series of convex shaped parts 6 without any binding knot formed thereat are successively formed in the spaced relation along the lower surface of the support rope R (FIG. 7) by way of the steps of inserting each of the ear portions S therethrough, displacing upwardly the combined structure of both ear portion and smaller ear portion and stretching the support rope R in the longitudinal direction when net expansion operation is performed on the sea. Owing to formation of the convex parts 6,6,6 . . . in that way, the strength of the support rope R can be increased remarkably.

This leads to advantageous features that a diameter of the support rope can be reduced at least by an extent of 1/5 to ¼ compared with that of the conventional one and moreover manhours required for connecting operation of the support rope to fishing net can be saved remarkably.

Figure 8:
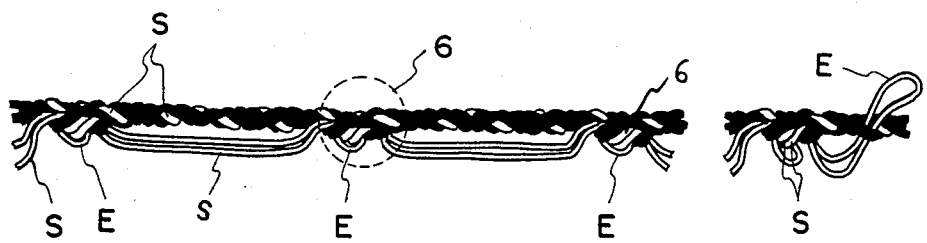
FIG. 8 is a schematic view of the support rope including the right-hand end part, particularly illustrating how connecting of the ear portions is achieved in accordance with the method of the present invention.
Figure 9:
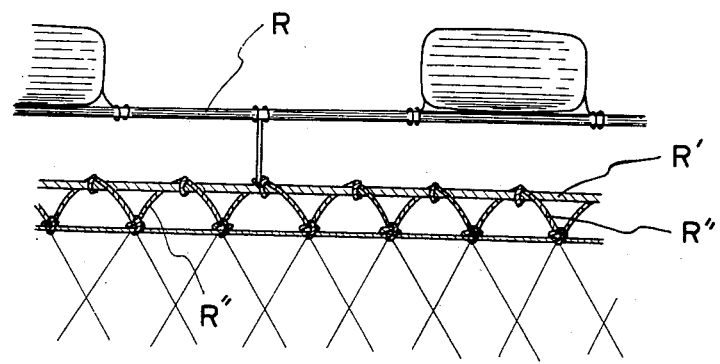
FIG. 9 is a fragmental view illustrating the connecting means of conventional fishing net.

When disassembling of the fishing net is required for the purpose of repairing it or replacing it with other one, disassembling operation is initiated from the rearmost smaller ear portion E (FIG. 8) and it is completed by way of the steps of disconnecting the ear portion from the smaller ear portion and repeating the same operations in the opposite direction to that in the case of net expansion operation whereby the whole fishing net N is disassembled from the support rope.

Obviously, the connecting and disconnecting operations will be performed in the same manner as described above with respect to the bottom area of fishing net.

The description has been made above as to the case where all practical fishing operations were performed in the fishing area on Japan Sea and Pacific Ocean and utilization of floats and weights (not shown) was determined in accordance with conventional fishing practices depending on the position where they were placed in the sea (in the range of 2 to 1,000 m in depth).

In the case where fishing operation was performed with the use of fixed net, fishing net expansion was achieved by a width of 20 m at the position of 12 m in depth as measured down from the sea surface. In this practical fishing operation, the main rope R (FIG. 10) used therefor had a diameter of 15 mm and it was found that the same fishing effect was obtainable as in the case when the conventional main rope having a diameter of 20 mm was used.

This means that a diameter of the main rope can be reduced to an extent of ¾ compared with that of the conventional one.

Further, in every embodiment mentioned above, it was confirmed that time required for connecting and disconnecting the same fishing net in width reduced by 1/20 compared with conventional ones, taking the difference swayed by the place where the operation was performed into account.

As long as the method of the present invention is employed, the formation of the convex parts 6,6,6 . . . without any binding knot formed thereat and stretching pattern of each of the ear portions S,S,S . . . in parallel with the support rope (FIG. 8) can be visually recognized at all times. Thus, the support rope R exhibits characteristic appearance.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A method of connecting an untied fishing net having a support rope and fishing net meshes, said support rope being formed from a strand of ropes and said strand of ropes forming a plurality of first ear portions integrally stranded with the support rope and depending therefrom, comprising the steps of:

hanging a portion of the fishing net meshes, one by one, on one of said first ear portions;

forming a second ear portion by inserting said first ear portion in said strand of ropes and then projecting a foremost part of said first ear portion from said strand by penetrating said foremost part of said first ear portion in a direction coaxial with said rope, said second ear portion being smaller in length than said first ear portion, and then operatively connecting said second ear portion with one of the next first ear portions without tying said ear portions by inserting said next first ear portion in said second ear portion;

successively repeating said steps one after another until, at the extreme end of connection, a final one of said first ear portions is firmly engaged to said rope by inserting said final ear portion in said rope; and disassembling said fishing net by repeating said steps in reverse order.

2. The method of claim 1 wherein said first ear portions depend from said support rope in a number of fixed positions in the longitudinal direction of the rope and the second ear portions depend from the support in a number of variable positions in the longitudinal direction of the rope, and the length of the projecting second ear portions is approximately equal to the distance between the variable position of the second ear portion and the fixed position of the first ear portion to which said second ear portion is connected, whereby said first ear portion and said second ear portion overlap one another in the area where they are operatively connected.

3. The method of claim 1 wherein said operative connections between said first ear portions and said second ear portions are formed by said first ear portions stretched in the transverse direction of the support rope, said operative connections are convex in shape, are equally spaced apart, and form no binding knots.

4. The method of claim 2 wherein said operative connections between said first ear portions and said second ear portions are formed by said first ear portions stretched in the transverse direction of the support rope, said operative connections are convex in shape, are equally spaced apart, and form no binding knots.

* * * * *